US010566889B2

(12) United States Patent
Katada

(10) Patent No.: US 10,566,889 B2
(45) Date of Patent: Feb. 18, 2020

(54) LINEAR VIBRATION MOTOR

(71) Applicant: Nidec Copal Corporation, Tokyo (JP)

(72) Inventor: Yoshinori Katada, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 15/507,378

(22) PCT Filed: Aug. 31, 2015

(86) PCT No.: PCT/JP2015/074744
§ 371 (c)(1),
(2) Date: Feb. 28, 2017

(87) PCT Pub. No.: WO2016/035761
PCT Pub. Date: Mar. 10, 2016

(65) Prior Publication Data
US 2017/0288523 A1    Oct. 5, 2017

(30) Foreign Application Priority Data
Sep. 5, 2014   (JP) .................................. 2014-181445

(51) Int. Cl.
*H02K 33/16*         (2006.01)
*B06B 1/04*          (2006.01)
(Continued)

(52) U.S. Cl.
CPC ............. *H02K 33/16* (2013.01); *B06B 1/045* (2013.01); *H02K 33/18* (2013.01); *H02P 25/032* (2016.02); *H02K 5/00* (2013.01)

(58) Field of Classification Search
CPC ...... H02K 33/16; H02K 33/18; H02P 25/032; B06B 1/045
See application file for complete search history.

(56) References Cited

U.S. PATENT DOCUMENTS

2002/0195884 A1* 12/2002 Ichii ....................... A61C 17/34
310/15
2007/0216235 A1*  9/2007 Lee ........................ H02K 33/16
310/36
(Continued)

FOREIGN PATENT DOCUMENTS

CN        101944818 A      1/2011
DE     102009047668 A1     1/2011
(Continued)

OTHER PUBLICATIONS

International Search Report dated Nov. 10, 2015 (English and Japanese) and Written Opinion (Japanese) issued in corresponding PCT International Application No. PCT/JP2015/074744.

*Primary Examiner* — Eduardo Colon Santana
*Assistant Examiner* — Said Bouziane

(57) ABSTRACT

A linear vibration motor has a movable element including a magnet and a weight, and an elastic member are inserted into a frame. The frame supports the movable element so the movable element can freely slide axially; a coil fixed to the frame and drives the magnet axially; and an elastic member applying, to the movable element, an elastic force against the driving force of the magnet. The frame has a bottom surface plate with a bottom surface affixing the coil; an upper surface plate has an upper surface opposing the bottom surface; and a front surface plate facing the axially and supports the elastic member. The bottom surface plate has partial side surface portions that are respectively bent from both side edges of the bottom surface portion and in which an opening is formed in a central part of the partial side surface portions in the axial direction.

6 Claims, 5 Drawing Sheets

(51) Int. Cl.
*H02P 25/032* (2016.01)
*H02K 33/18* (2006.01)
*H02K 5/00* (2006.01)

(56) References Cited

U.S. PATENT DOCUMENTS

| | | | | |
|---|---|---|---|---|
| 2011/0006618 A1* | 1/2011 | Lee | ................ | B06B 1/045 310/25 |
| 2011/0101797 A1* | 5/2011 | Lee | ................ | H02K 33/16 310/29 |
| 2012/0313459 A1* | 12/2012 | Zhang | ................ | H02K 33/18 310/25 |

FOREIGN PATENT DOCUMENTS

| | | | |
|---|---|---|---|
| GB | 2471735 | A | 1/2011 |
| JP | 2002200460 | A | 7/2002 |
| JP | 2007252195 | A | 9/2007 |
| JP | 2011019384 | A | 1/2011 |
| JP | 2014028349 | A | 2/2014 |
| KR | 20070094311 | A | 9/2007 |
| KR | 20080004730 | A | 1/2008 |
| KR | 20110004246 | A | 1/2011 |

* cited by examiner

LINEAR VIBRATION MOTOR

CROSS-REFERENCE TO RELATED APPLICATIONS

This is a U.S. national phase application under 35 U.S.C. § 371 of International Patent Application No. PCT/JP2015/074744, filed Aug. 31, 2015, and claims benefit of priority to Japanese Patent Application No. 2014-181445, filed Sep. 5, 2014. The entire contents of these applications are hereby incorporated by reference.

FIELD OF TECHNOLOGY

The present invention relates to a linear vibration motor for generating a vibration through causing a movable element to undergo reciprocating vibration linearly through a signal input.

BACKGROUND

A vibration motor (or a vibration actuator) is that which communicates, to a user of a communication device or to an operator who is holding any of a variety of electronic devices, the state of an input signal through a vibration, through generating a vibration through an incoming call on a communication device or through the transmission of an alarm on any of a variety of electronic devices, and is built into any of a variety of electronic devices, such as mobile information terminals, including mobile telephones.

Among the various forms of vibration motors that are under development, there are known linear vibration motors that are able to generate relatively large vibrations through linear reciprocating vibrations of a movable element. This linear vibration motor comprises a coil that is disposed within a frame, and a weight, which is vibrated linearly, by a magnet, along a vibrational axis within the frame, through cooperation with a magnet that is surrounded by this coil, and which vibrates together with the magnet along the vibrational axis, where a coil spring is disposed between an end portion of the weight and an inner surface of the frame, so that the elastic force of the coil spring repels the driving force of the coil and the magnet, to cause the movable element, made from the magnet and the weight, to vibrate within the frame (for example, Japanese Unexamined Patent Application Publication 2014-028349).

SUMMARY

In a conventional linear vibration motor, an elastic member (a coil spring) is disposed within the frame, to produce a linear vibration along the axial direction through causing both the driving force that is produced by the coil and the magnet, and the elastic force of the elastic member (the coil spring), to act in the same axial direction. At this time, the elastic member is disposed positioned by a protruding portion that is formed within the frame and a recessed/raised portion that is formed on an end portion of the weight, but in the prior art wherein the elastic member and the movable element that is made from the magnet and the weight are built in advance into a frame that is formed into a box shape, it is not possible to check, in the end, whether or not the elastic member is assembled into the frame in an appropriate state, requiring more careful operations at the time of assembly, and thus there is a problem in that simple asemblability is not possible.

In the present invention, the handling of such problems is an example of the problem to be solved. That is, the object of the present invention is to enable simple asemblability, through the ability to carry out the assembly operation while confirming the proper state of attachment of the elastic member, in a linear vibration motor wherein an elastic member and a movable element that is made from a magnet and a weight are built into a frame.

In order to achieve such an object, the linear vibration motor of the present invention is equipped with the following structures:

a linear vibration motor comprising: a movable element equipped with a magnet and a weight; a frame for supporting the movable element so as to be able to slide along the axial direction; a coil, secured to the frame, for driving the magnet along the axial direction; and an elastic member for applying, to the movable element, an elastic force that opposes the driving force that is applied to the magnet, wherein: a bottom plate that has a bottom face portion whereon the coil is secured; a top face plate that has a top face portion that faces the bottom face portion; and end face plates, facing the axial direction, for supporting the elastic member, wherein: the bottom plate has a partial side face portion that is bent from a side edge of the bottom face portion, wherein an open portion is formed in a center part along the axial direction.

DETAILED DESCRIPTION

Figure 1:
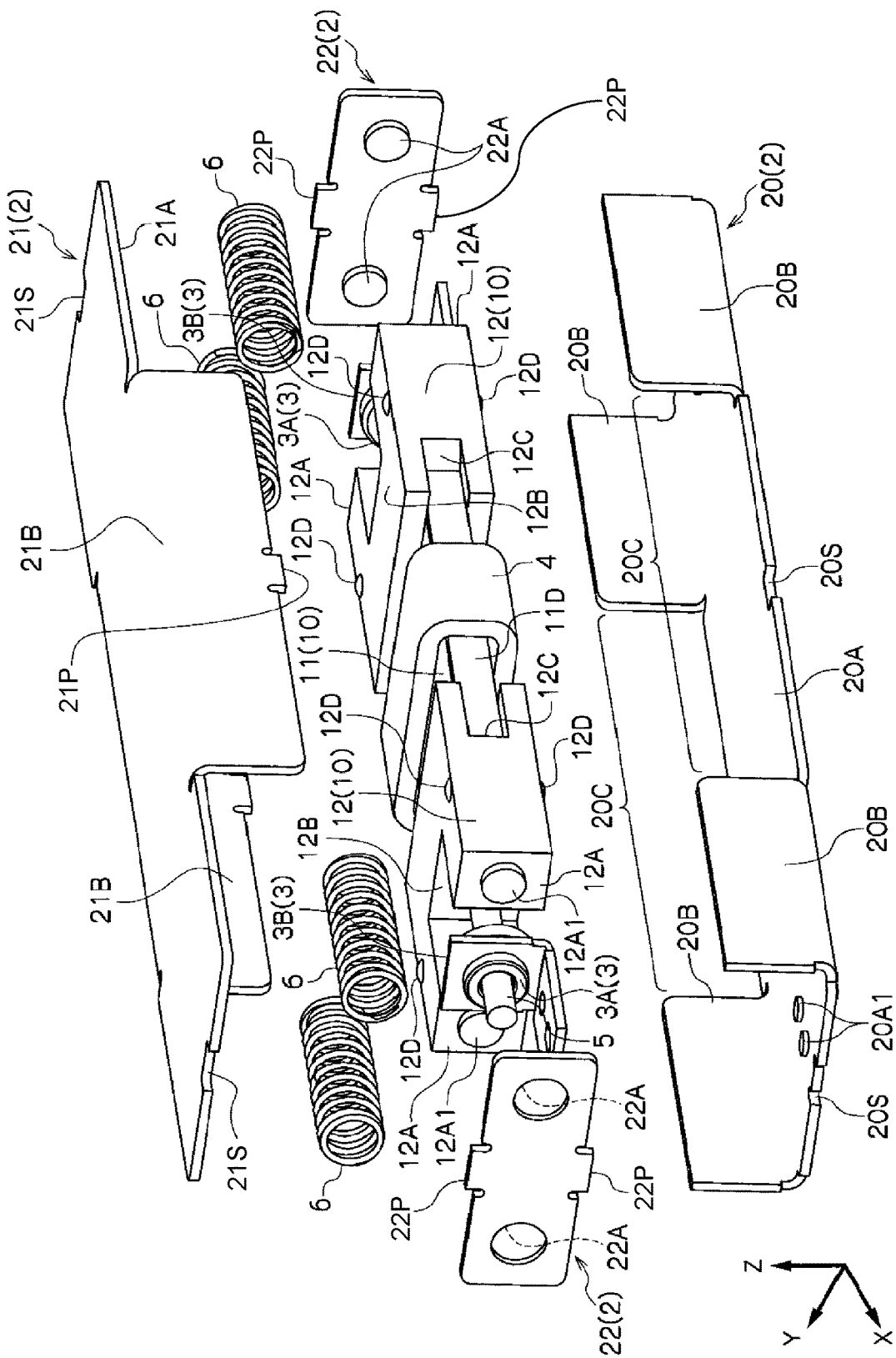
FIG. 1 is an explanatory diagram (an assembly perspective diagram) illustrating the overall structure of a linear vibration motor according to an example according to the present invention.

A linear vibration motor according to an example according to the present invention comprises: a movable element that is provided with a magnet and a weight; a frame that supports the movable element so as to be able to slide along an axial direction; a coil, secured to the frame, for driving the magnet along the axial direction; and an elastic member for applying, to the movable element, an elastic force that repels the driving force that acts on the magnet. Here the structure wherein the frame supports the movable element so as to be able to oscillate may be of any shape. For example, the form may be one wherein a single shaft, a plurality of shafts, or a guide is provided in the axial direction within the frame, where the movable element is supported so as to be able to slide along the shaft or guide, or a form may be used wherein the movable element within the frame is constrained to the axial direction, without the provision of a shaft or guide.

The frame of the linear vibration motor according to an example according to the present invention comprises: a bottom face plate that has a bottom face portion whereon the coil is secured; a top face plate that has a top face portion that faces the bottom face portion; and perpendicular face plates, facing the axial direction, for supporting the elastic member, wherein: the bottom face plate has a partial side face portion that is bent from a side edge of the bottom face portion, wherein an open portion is formed in a center part along the axial direction.

In the linear vibration motor having such distinguishing features, the frame being provided with the bottom face plate, the top face plate, and the perpendicular face plates enables assembly through joining the perpendicular face plates with edges of the bottom face plate in a state wherein the coil is secured to the bottom face portion of the bottom face plate, and the movable element and the elastic members to be assembled to the bottom face plate in an open state, followed by joining the bottom face plate and the top face plate together. In this way, this enables simple and accurate assembly through the ability to join, at the end, the bottom face plate and the top face plate together after checking the appropriate assembly of the elastic members.

Moreover, because the bottom face plate to which the movable element and the elastic member are assembled has a partial side face portion wherein an open portion is formed in the center part along the axial direction, the operation for joining together the magnet and the weights can be carried out through an easy operation through the use of the open portion in a state wherein the magnets are inserted into openings of the coil that is secured to the bottom face portion. At this time, the magnet and the weights are joined together in a state wherein the magnets are inserted into the coil, enabling relative freedom in the size and shape of the weights, making it possible to achieve a linear vibration motor that uses little energy, through the use of large weights.

Figure 2:
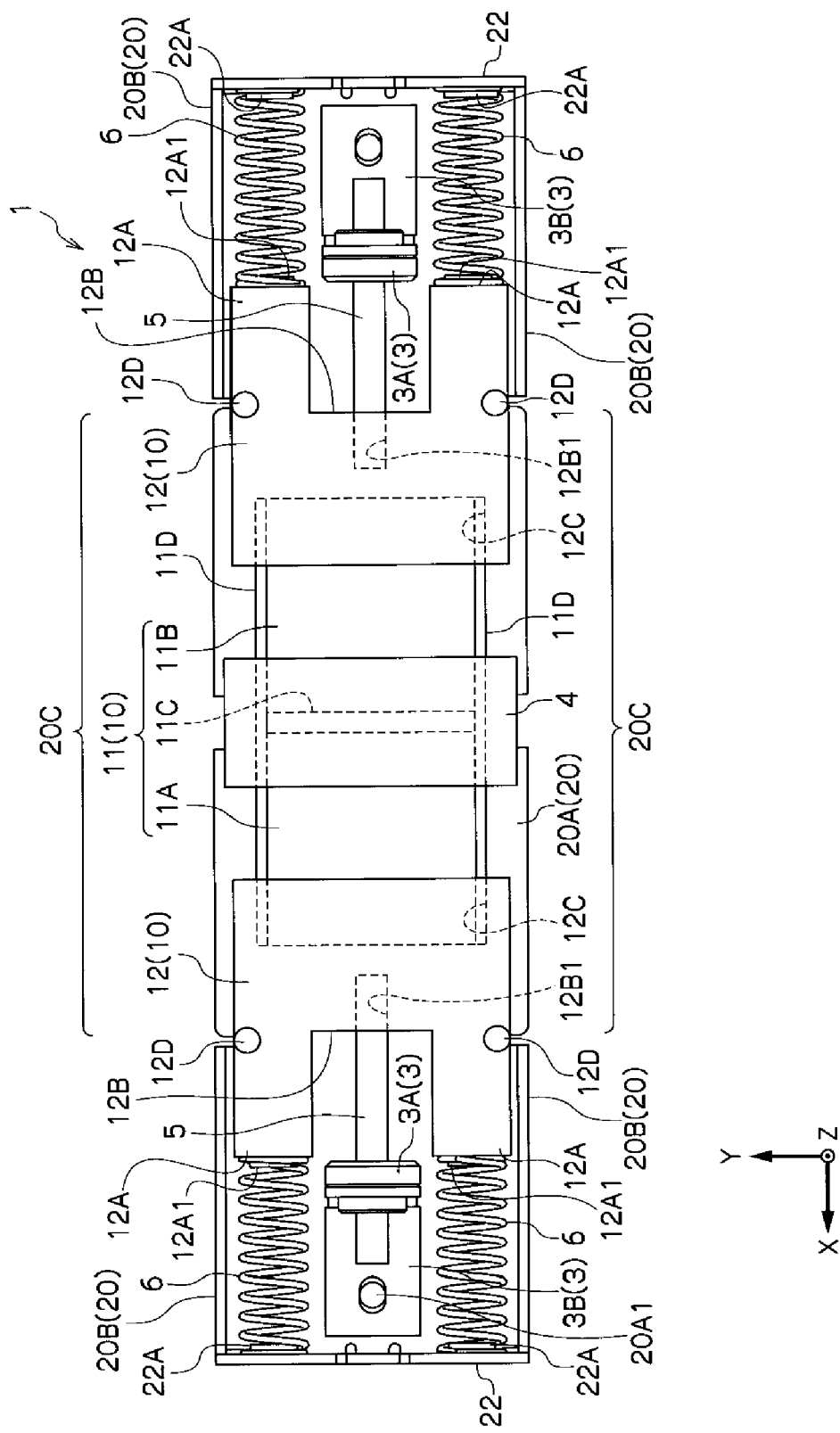
FIG. 2 is an explanatory diagram (a plan view diagram showing the internal structure) illustrating the overall structure of a linear vibration motor according to an example according to the present invention.
Figure 3:
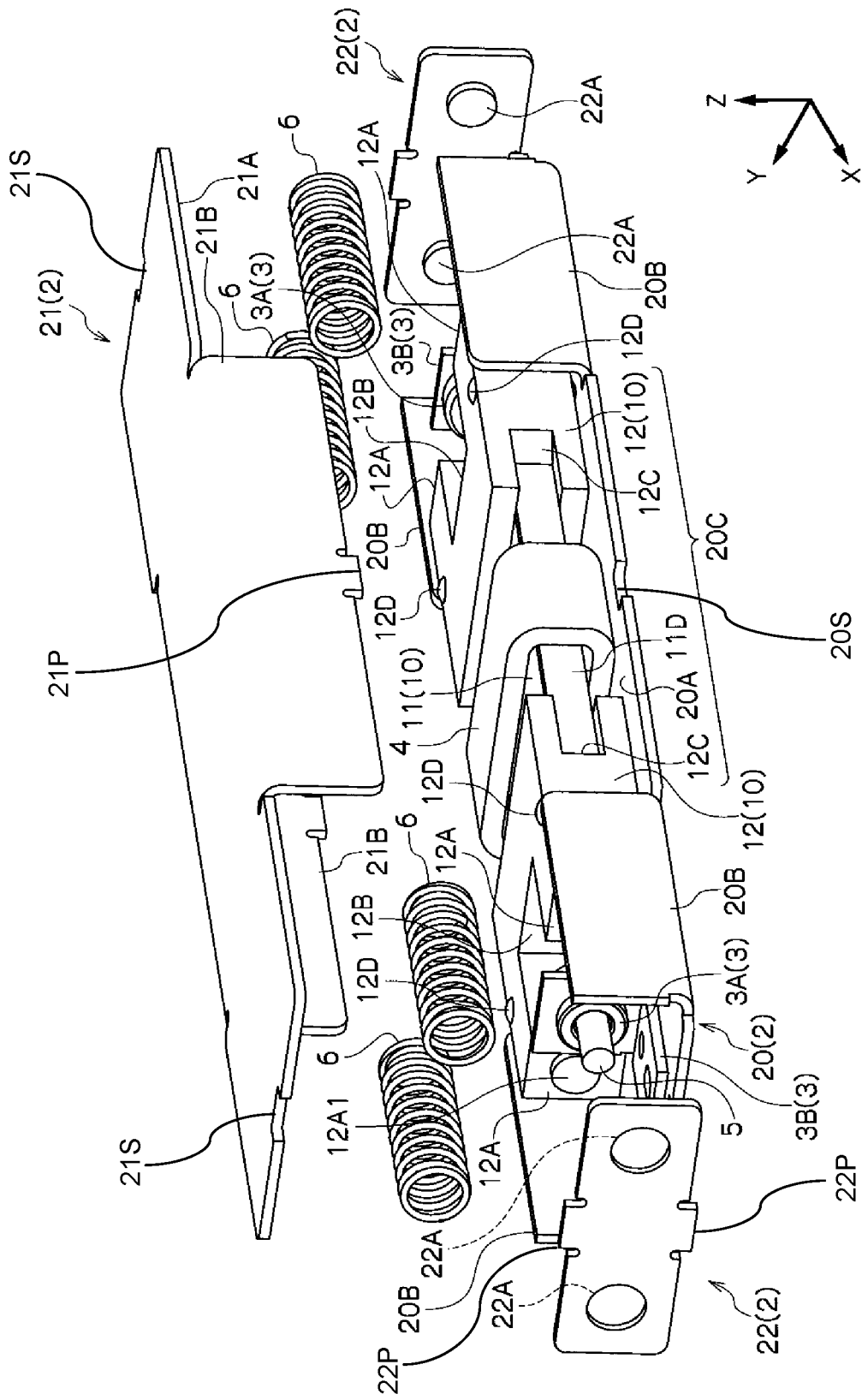
FIG. 3 is an explanatory diagram (a perspective view showing the attached state) illustrating the overall structure of a linear vibration motor according to an example according to the present invention.
Figure 4:
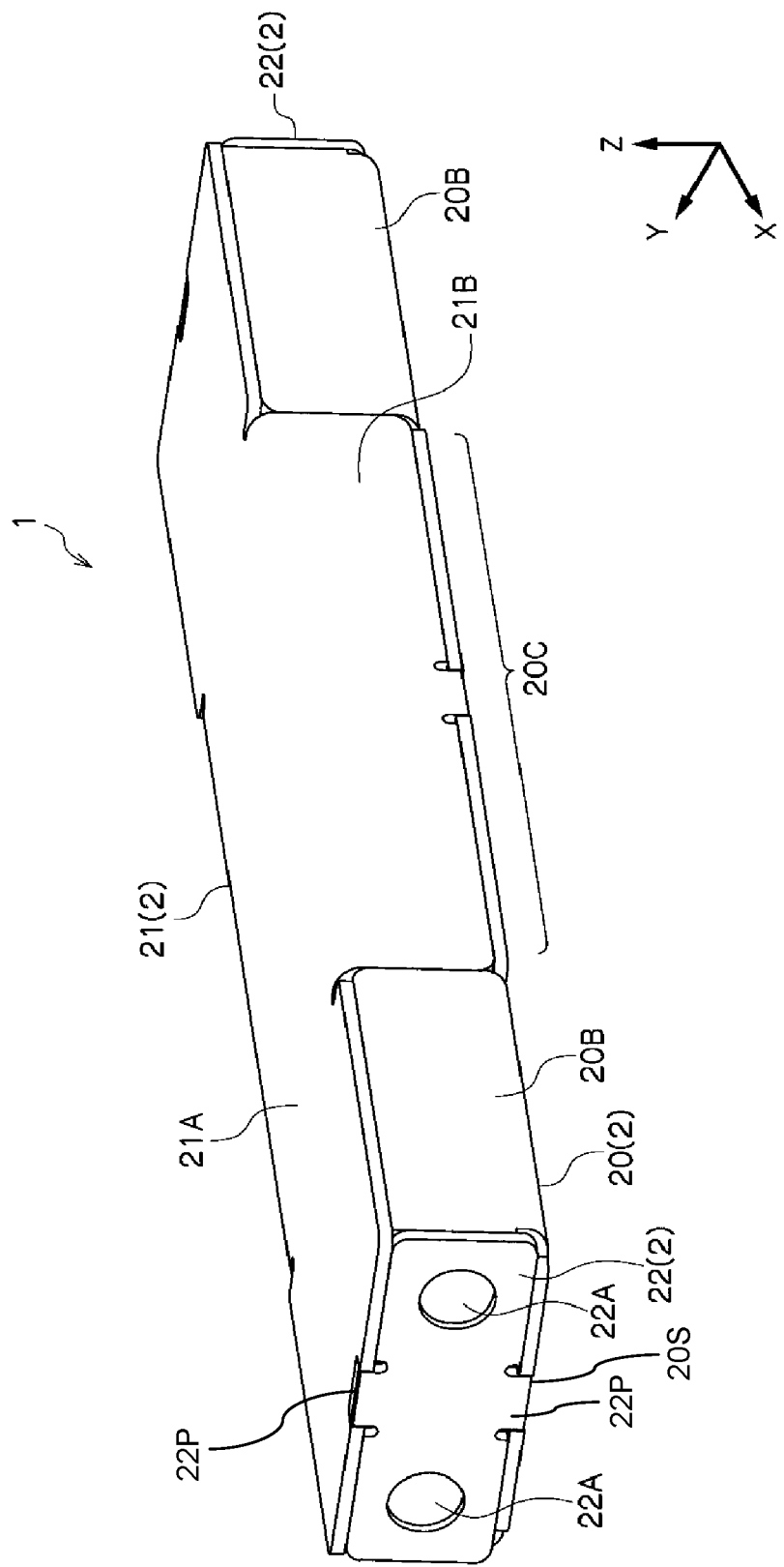
FIG. 4 is an explanatory diagram (a perspective view showing the state after assembly has been completed) illustrating the overall structure of a linear vibration motor according to an example according to the present invention.

An example according to the present invention will be explained below in reference to the drawings (where in different drawings below, identical reference symbols indicate identical positions, and redundant explanations in the individual drawings are omitted.) FIG. 1 through FIG. 4 illustrate the overall structure of a linear vibration motor according to one example according to the present invention (where FIG. 1 is an exploded perspective diagram, FIG. 2 is a plan view that illustrates the internal structure, FIG. 3 is a perspective diagram that illustrates the assembled state, and FIG. 4 is a perspective diagram illustrating the state wherein the assembly has been completed). The X direction in each of the drawings indicates the direction of vibration (the axial direction), the Y direction indicates the width direction, and the Z direction indicates the thickness (height) direction. The example that is illustrated is one example according the present invention, and the present invention is not limited thereto. In particular, the structure wherein the movable element is supported slidably on the frame is not limited to the example that is illustrated.

The linear vibration motor 1 comprises: a movable element 10 that is equipped with a magnet 11 and a weight 12; a frame 2 for supporting the movable element 10 so as to be able to slide along the axial direction; a coil 4 that is secured to the frame 2, for driving the magnet 11 along the axial direction; and an elastic member 6 for applying, to the movable element 10, an elastic force for repelling the driving force that acts on the magnet 11.

The frame 2 comprises a bottom face plate 20, a top face plate 21, and perpendicular face plates 22, where these are joined together to form the frame 2. The bottom face plate 20, the top face plate 21, and the end face plates 22 are each formed through machining (pressing processes, or the like) respective metal plates. More specifically, the bottom face plate 20 and the top face plate 21 that structure a magnetic circuit in respect to the coil 4 can be formed from, for example, stainless steel plates of a magnetic material, where the pair of end face plates 22 that do not structure a magnetic circuit may be formed from stainless steel plates of a non-magnetic material.

The bottom face plate 20 has a bottom face portion 20A to which the coil 4 is secured, a partial side face portion 20B that is bent from the side edge of the bottom face portion 20A, and an open portion 20C, wherein the center part along the axial direction (the X direction in the figure, which is the direction of vibration) is open on a side edge of the bottom face portion 20A. The top face plate 21 has a top face portion 21A that faces the bottom face portion 20A, and a partial side face portion 21B that is bent from the side edge of this top face portion 21A. The end face plates 22 are provided in a pair that is mutually facing in the axial direction (the X direction in the figure, which is the direction of vibration), and have supporting portions 22A for supporting the elastic members 6.

Here, in the example that is illustrated, the bottom face portion 20A of the bottom face plate 20 and the top face portion 21A of the top face plate 21 are formed in rectangular shapes wherein the lengthwise direction is the axial direction (the X direction in the figure), where the partial side face portions 20B and 21B, along the long edges thereof, are formed bent so as to be essentially perpendicular to the bottom face portion 20A or top face portion 21A. Given this, the end face plates 22 are formed in rectangular shapes having outer peripheral edges depending on the short edges of the bottom face portion 20A and the top face portion 21A, and the height of the partial side face portion 20B.

The partial side face portion 21B of the top face plate 21 is formed so as to cover the open portion 20C of the bottom face plate 20, where a protruding portion 21P for engaging with a recessed portion 20S that is formed on a side edge of the bottom face portion 20A in the open portion 20C is formed on the bottom edge of the partial side face portion 21B. Moreover, protruding portions 20P for engaging with recessed portions 21S, 20S that are formed on edges of the top face plate 21 and the bottom face plate 20 are formed on the top and bottom edges of the end face plates 22.

In regards to such a frame 2, the coil 4 is secured to the bottom face portion 20A, and a driving portion is structured from the coil 4 that is secured to the frame 2 and the magnet 11 that is a portion of the movable element 10. Lorentz forces that act on the magnet 11 through the application of the electric current to the stationary coil 4 act as driving forces that cause the movable element 10 to vibrate along the axial direction (the X direction in the figure).

As illustrated in FIG. 11, in the magnet 2, two flat rectangular magnet pieces 11A and 11B that have polarities along the axial direction (the X direction in the figure) are disposed with identical poles facing each other, connected with a spacer yoke 11C interposed therebetween. If necessary, a reinforcing plate 11D is secured to a side face of the magnet 11 to increase the rigidity of the magnet 11 thereby.

The coil 4 is a wire wrapped, along the Y and Z directions, around the magnet 11 wherein the direction of the magnetic pole faces in the X direction. The securing of the coil 4 to the bottom face portion 20A may be through securing directly to the bottom face portion 20A, or may be through winding the coil 4 onto a coil bobbin and securing the coil bobbin onto the bottom face portion 20A.

In the example that is illustrated, in the movable element 10, weights 12 are connected to both end portions of the magnet 11 in the axial direction (the X direction in the figure). The weight 12 may be structured through, for example, a metal material with a high specific gravity, and, in the example that is illustrated, has a shape that is a rectangular prism that has a Z-direction height that is greater than the thickness of the magnet 11, and a width in the Y direction that is greater than the width of the magnet 11.

The movable element 10 is provided with a pair of shaft portions 5 that protrude in mutually opposing directions along the axial direction (the X direction in the figure). The shaft portions 5 are provided protruding in cantilever shapes from both axial-direction end portions of the movable element 10. In the example that is illustrated, shaft portions 5 protrude from within recessed portions 12B of respective weights 12 that are connected to both axial-direction end portions of the magnet 11, where here one end side of the shaft portion 5 is inserted and secured in a shaft supporting portion 12B1 that is provided in the weight 12.

Bearing portions 3 for supporting respectively, the pair of shaft portions 5 are provided on the bottom face portion 20A of the bottom face plate 20. The movable element 10 is supportive slidably, relative to the frame 2, through the bearing portions 3 supporting the pair of shaft portions 5 so as to be able to slide. The bearing portion 3 is structured from a bearing 3A and a bearing supporting member 3B, where the bearing supporting member 3B is attached to the bottom face portion 20A of the bottom face plate 20, and the bearing 3A is attached to the standing portion of the bearing supporting member 3B. A positioning protrusion 20A1 that protrudes for positioning is provided in the bottom face portion 20A, where the bearing supporting member 3B is attached to this positioning protrusion 20A1.

The recessed portion 12B of the weight 12 wherein the shaft portion 5 protrudes has a width that enables insertion of the bearing portion 3. The provision of such a recessed portion 12B enables the X-direction length of the linear vibration motor 1 to be kept short, while enabling a large vibrational amplitude for the movable element 10.

Elastic members 6 are disposed off-axis from, and in parallel to, the pair of shaft portions 5, to apply, to the movable element 10, an elastic force that opposes the driving force that is produced by the magnet 11 and the coil 4. In the example that is illustrated, compression coil springs that extend and compress along the axial direction (the X direction) are used as the elastic members 6, where on one side two elastic members 6 are disposed between the end portion 12A of the weight 12 and the end face plate 22. A supporting portion (a supporting protrusion) 12A1, for supporting one end side of the elastic member 6, is provided on an end portion 12A of the weight 12, and a supporting portion (a supporting protrusion) 22A, for supporting the other end side of the elastic member 6, is provided on the inner surface side of the end face plate 22.

The operation of such a linear vibration motor 1 will be explained. When not driven, the movable element 10 stands still in the vibration center position wherein the elastic forces of the elastic members 6 are in equilibrium. When an electric current of a vibration generation signal is inputted into the coil 4, a driving force is applied to the magnet 11 in the X direction, and the movable element 10 undergoes reciprocating vibration along the axial direction (the X direction in the drawing) through the driving force and the elastic repulsive force of the elastic member 6.

If necessary, sliding protrusions 12D for making sliding contact with the bottom face portion 20A and the top face portion 21A, are provided on the surface of the weight 12 in the movable element 10. The provision of such sliding protrusions 12D, and the formation of the location of sliding contact between the bottom face portion 20A and the top face portion 21A from a resin material, or the like, enables suppression of noise at the time of vibration of the movable element 10, and enables a stabilized vibration. At this time, the location of sliding contact may be provided instead on the weight 12 surface side, and the sliding protrusions may be provided instead on the bottom face portion 20A and the top face portion 21A.

The method for assembling such a linear vibration motor 1 (the manufacturing method thereof) will be explained. As illustrated in FIG. 3, the assembly of each of the parts is performed in a state wherein the bottom face portion 20A of the bottom face plate 20 is open. First the coil 4 is secured to the bottom face portion 20A of the bottom face plate 20. The coil 4 is secured to the bottom face portion 20A through an adhesive agent, or the like.

Given this, a weight 12, in a state wherein the shaft portion 5 is attached, is joined in advance to one end side of the magnet 11 in the axial direction (the X direction in the figure), and after the other end side, in the axial direction, of the magnet 11 is inserted into the opening of the coil 4, a weight 12, in a state wherein the shaft portion 5 is attached, is joined to the other end side, in the axial direction, of the magnet 11. The joining of the magnet 11 and the weight 12 is through, for example, inserting end portion of the magnet 11 into a joining portion 12C of the weight 12 and welding. At this time, the joining together of the magnet 11 and the weight 12, which is carried out in a state wherein the other end side, in the axial direction, of the magnet 11 has been inserted into the opening of the coil 4, can be carried out through a joining operation in a state wherein the junction portion 12C is exposed by the open portion 20C, enabling the operation to be performed easily.

Thereafter, respective bearings 3A of bearing portions 3 are inserted into/slid onto the pair of shaft portions 5, and the bearing supporting members 3B of the bearing portions 3 engage with the positioning protrusions 20A1 on the bottom face portion 20A, to be secured to the bottom face portion 20A. At this time, both the end face plate sides of the bottom face plate 20 are open, and thus the operation for securing the bearing supporting member 3B to the bottom face portion 20A can be carried out easily.

Following this, the two end face plates 22 are joined to the end face side edges of the bottom face plate 20 (the perpendicular face side edges of the bottom face portion 20A and the partial side face portion 20B). Moreover, four elastic members 6 are disposed between the pair of end face plates 22 and the end portions 12A of the weights 12, where both end portions of the elastic members 6 are attached, respectively, to the supporting portions 12A1 and the supporting portions 22A.

This state is one wherein the bottom face plate 20 is still open, making it possible to check the state of attachment of the elastic members 6, and the like. Given this, after it has been confirmed that the state of attachment of the elastic members 6, and the like, is correct, the top face portion 21A is turned to face the bottom face portion 20A, and the top face plate 21 is placed over the bottom face plate 20, so that the partial side face portion 21B of the top face plate 21 will block the open portion 20C of the bottom face plate 20, and the bottom face plate 20 and the top face plate 21, or the end face plates 22 and the top face plate 21, are joined together. FIG. 4 shows the state wherein the assembly has been completed by joining together the bottom face plate 20, the top face plate 21, and the end face plates 22. In this state, the movable element 10, the bearing portions 3, the coil 4, and the elastic members 6 are enclosed within the frame 2 that is formed from the bottom face plate 20, the top face plate 21, and the end face plates 22.

Note that while the example described above illustrates an example wherein the bottom face plate 20 and the end face plates 22 are formed from separate members, instead the end face plates (the end face portions) 22 may be formed through bending from the perpendicular face edges of the bottom face portion 20A that are portions of the bottom face plate 20.

As explained above, in the linear vibration motor 1 according to an example according to the present invention the coil 4, the movable element 10, the bearing portions 3, the elastic members 6, and the like, are assembled onto the bottom face portion 20A with the bottom face portion 20A in an open state, where the bottom face plate 20 and the top face plate 21 are joined together after this assembly has been completed, to enclose the coil 4, the movable element 10, the bearing portions 3, the elastic members 6, and the like, within the frame 2. This makes it possible to join the bottom face plate 20 and the top face plate 21 together after confirming that the assembly of the elastic members 6, and the like, is in the correct state. Moreover, the center part on the side face side of the bottom face portion 20A is open, through the open portion 20C, at the time of the operations for assembling the various portions onto the bottom face portion 20A, and the perpendicular face sides of the bottom face portion 20A are open until the end face plates 22 are attached, enabling the assembly operation to be carried out easily.

Figure 5:
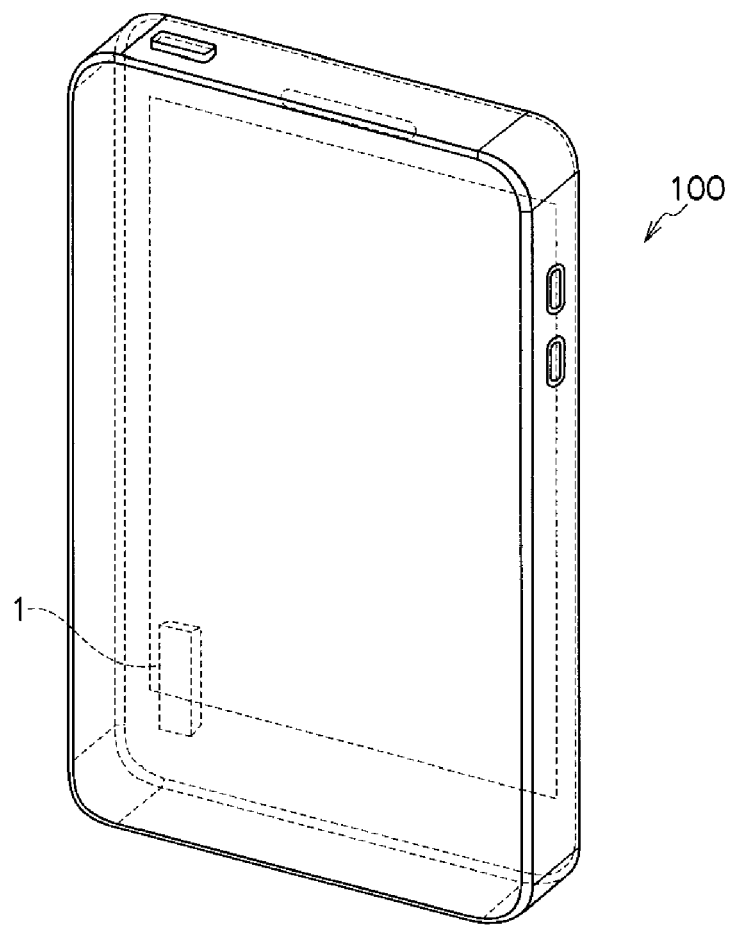
FIG. 5 is an explanatory diagram illustrating the electronic device (a mobile information terminal) equipped with a linear vibration motor according to an example according to the present invention.

FIG. 5 shows a mobile information terminal 100 as an example of an electronic device equipped with a linear vibration motor 1 according to an example according to the present invention. The mobile information terminal 100 that is equipped with the linear vibration motor 1 that can produce a stabilized vibration and for which the thickness can be reduced and which can be made more compact in the width direction enables the user to be notified through a stabilized vibration that does not tend to produce noise, when there is an incoming call in a communication function or at the beginning or end of an operation such as an alarm function. Moreover, this makes it possible to produce a mobile information terminal 100 with high mobility and which facilitates design performance, through the linear vibration motor 1 having reduced thickness and being more compact in the width direction. Furthermore, because the linear vibration motor 1 is of a compact shape wherein the various components are contained within a frame 2 of a rectangular shape wherein the thickness is suppressed, it can be mounted, with excellent space efficiency, within a thinner mobile information terminal 100.

While examples according to the present invention were described in detail above, referencing the drawings, the specific structures thereof are not limited to these examples, but rather design variations within a range that does not deviate from the spirit and intent of the present invention are also included in the present invention.

The invention claimed is:

1. A linear vibration motor comprising:
a movable element comprising a magnet and a weight;
a frame supporting the movable element such that the movable element can slide along the axial direction;
a coil, secured to the frame, driving the magnet along the axial direction;
an elastic member applying, to the movable element, an elastic force that opposes the driving force that is applied to the magnet,
wherein a bottom plate comprising a bottom face portion whereon the coil is secured;
a top plate comprising a top face portion that faces the bottom face portion; and
end plates, facing the axial direction, supporting the elastic member,
wherein the bottom plate has a partial side face portion at each end that is bent from a side edge of the bottom face portion, wherein an open portion is formed in a center part along the axial direction, such that a width of the open portion is a width approximately equivalent to a total width of each of the partial side face portions,
wherein the weight has a shape of a rectangular prism with a height greater than a thickness of the magnet, and a width greater than a width of the magnet, and
wherein the weight defines a recessed portion that allows a shaft portion to protrude, the recessed portion has a width that enables insertion of a bearing portion, wherein the recessed portion enables a length of the linear vibration motor in the axial direction to be kept short, while enabling a vibrational amplitude for the movable element.

2. The linear vibration motor as set forth in claim 1, wherein the top plate has a partial side face portion, blocking the opening portion, bent from a side edge of the top face portion.

3. The linear vibration motor as set forth in claim 1, wherein a joining portion for the magnet and the weight is exposed in the open portion.

4. The linear vibration motor as set forth in claim 1, wherein the end face plate is joined to an edge, in the axial direction, at the bottom plate.

5. The method for manufacturing a linear vibration motor as set forth in claim 4, comprising the steps of:
securing the coil to the bottom face portion;
inserting the other end side of the magnet, wherein the weight is joined to one end side thereof in the axial direction, into an opening of the coil, and joining the weight to the other end side of the magnet;
joining the end face plate to an edge, in the axial direction, at the bottom plate;
providing the elastic member between an end portion of the weight and the end face plate; and
orienting the top face portion facing the bottom face portion, and joining the bottom plate and the top plate.

6. A mobile information terminal comprising a linear vibration motor as set forth in claim 1.

* * * * *